(12) United States Patent
Needamangala et al.

(10) Patent No.: US 9,274,768 B2
(45) Date of Patent: *Mar. 1, 2016

(54) RUNTIME CODE HOOKING FOR PRINT DRIVER AND FUNCTIONALITY TESTING

(71) Applicant: Microsoft Technology Licensing, LLC, Redmond, WA (US)

(72) Inventors: Ashwin S. Needamangala, Redmond, WA (US); Daniel S. Mihai, Snoqualmie, WA (US); Hristo H. Ivanov, Redmond, WA (US); Marius Popa, Kirkland, WA (US); Mariyan D. Fransazov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,106

(22) Filed: Jun. 17, 2014

(65) Prior Publication Data

US 2014/0359582 A1    Dec. 4, 2014

Related U.S. Application Data

(63) Continuation of application No. 12/055,300, filed on Mar. 25, 2008, now Pat. No. 8,793,662.

(51) Int. Cl.
| | |
|---|---|
| *G06F 9/42* | (2006.01) |
| *G06F 9/54* | (2006.01) |
| *G06F 9/45* | (2006.01) |
| *G06F 9/445* | (2006.01) |
| *G06F 11/36* | (2006.01) |

(52) U.S. Cl.
CPC .. *G06F 8/41* (2013.01); *G06F 8/67* (2013.01); *G06F 11/3644* (2013.01); *G06F 11/3668* (2013.01)

(58) Field of Classification Search
None
See application file for complete search history.

(56) References Cited

U.S. PATENT DOCUMENTS

| | | | |
|---|---|---|---|
| 5,454,086 | A | 9/1995 | Alpert et al. |
| 5,583,981 | A | 12/1996 | Pleyer |
| 5,671,417 | A | 9/1997 | Miclette et al. |
| 6,026,236 | A | 2/2000 | Fortin et al. |
| 6,035,426 | A | 3/2000 | Applegate |
| 6,141,698 | A | 10/2000 | Krishnan et al. |
| 6,263,491 | B1 | 7/2001 | Hunt |
| 6,397,382 | B1 | 5/2002 | Dawson |
| 6,463,583 | B1 | 10/2002 | Hammond |
| 6,546,553 | B1 | 4/2003 | Hunt |
| 6,901,584 | B2 | 5/2005 | Shann |

(Continued)

OTHER PUBLICATIONS

Detmer, R., "Introduction to 80×86 Assembly Language and Computer Architecture" (2001), Jones and Bartlett Publishers, Inc., pp. 86-94, 138-157.*

(Continued)

*Primary Examiner* — Brian W Wathen
(74) *Attorney, Agent, or Firm* — Sunah Lee; Kate Drakos; Micky Minhas (57) ABSTRACT

Runtime code hooking techniques are described in which a place holder instruction within a compiled module is used as an entry point to enable code hooking. A hook function to modify a target function is developed. At runtime, the target function to be modified is located. A place holder instruction within the target function is overwritten with instructions to cause execution of the hook function when the target function is called.

20 Claims, 4 Drawing Sheets

(56) References Cited

U.S. PATENT DOCUMENTS

| | | | |
|---|---|---|---|
| 6,948,164 | B2 | 9/2005 | Tinker |
| 6,971,048 | B1 | 11/2005 | Hanson et al. |
| 7,010,785 | B2 | 3/2006 | Haber et al. |
| 7,111,307 | B1 | 9/2006 | Wang |
| 7,137,105 | B2 | 11/2006 | Madsen et al. |
| 7,213,153 | B2 | 5/2007 | Hollander |
| 7,296,138 | B1 | 11/2007 | Conover et al. |
| 7,472,384 | B1 | 12/2008 | Beloussov et al. |
| 7,716,686 | B1 | 5/2010 | Dalcher et al. |
| 8,793,662 | B2 | 7/2014 | Needamangala et al. |
| 2002/0073398 | A1 | 6/2002 | Tinker |
| 2004/0010735 | A1 | 1/2004 | Paternostro et al. |
| 2004/0019885 | A1 | 1/2004 | Mandava et al. |
| 2004/0088684 | A1* | 5/2004 | Gazdik et al. ............. 717/133 |
| 2004/0107416 | A1 | 6/2004 | Buban et al. |
| 2004/0123279 | A1 | 6/2004 | Boykin et al. |
| 2005/0149947 | A1 | 7/2005 | Callender |
| 2005/0257208 | A1 | 11/2005 | Blumfield et al. |
| 2006/0174226 | A1 | 8/2006 | Fair et al. |
| 2006/0248542 | A1 | 11/2006 | Wang et al. |
| 2007/0234295 | A1 | 10/2007 | Dufour et al. |
| 2007/0261044 | A1 | 11/2007 | Clark |
| 2009/0249368 | A1 | 10/2009 | Needamangala |

OTHER PUBLICATIONS

EliCZ, "Microsoft Patching Internals" (Apr. 26, 2006), pp. 1-3 [retrieved from http://www.openrce.org/articles/full_view/22].*
Hunt, G.; Brubacher, D., "Detours: Binary Interception of Win32 Functions" (Jul. 1999), Proceedings of the Third USENIX Windows NT Symposium, pp. 1-9 [retrieved from http://research.microsoft.com/pubs/68568/huntusenixnt99.pdf].*
Windows, "Windows XP Service Pack 2 Network Installation Package for IT Professionals and Developers" (Apr. 26, 2012), [retrieved from https://web.archive.org/web/20120426205321/http://www.microsoft.com/en-us/download/details.aspx?id=28].*
Grainger, B. "Profiling Jscript, Part 0" (Oct. 30, 2004), pp. 1 [retrieved from http://bradleygrainger.com/2004/10/30/profiling-jscript-part-0.html].*
"Final Office Action", U.S. Appl. No. 12/055,300, Mar. 1, 2012, 21 pages.
"Final Office Action", U.S. Appl. No. 10/647,581, Aug. 4, 2009, 28 pages.
"Final Ofice Action", U.S. Appl. No. 10/395,565, Jan. 6, 2009, 23 pages.
"JUnit FAQ", retrieved from <www.cs.wm.edu/-noonan/junit/doc/faq.htm>, Aug. 2002, 22 pages.
"Non Final Office Action", U.S. Appl. No. 10/647,581, Feb. 17, 2009, 33 pages.
"Non-Final Office Action", U.S. Appl. No. 12/055,300, Sep. 26, 2013, 20 pages.
"Non-Final Office Action", U.S. Appl. No. 12/055,300, Nov. 14, 2011, 17 pages.
"Non-Final Office Action", U.S. Appl. No. 12/055,300, Jul. 29, 2011, 14 pages.
"Notice of Allowance", U.S. Appl. No. 12/055,300, Mar. 17, 2014, 6 pages.
"Silvermark's Enhanced JUnit", available at <www.silvermark.com/Library/publications/presentations/enhaced/juni.enhancedjunits.pdf>, User Reference, Version 3.7, Copyright 1996-2002 SilverMark, Inc.,Jan. 2002, 58 pages.
Dispensa, "Hot Patching", Retrieved from: <http://msmvps.com/blogs/kernelmustard/archive/2005/04/25/44413.aspx> on Nov. 4, 2011,Apr. 25, 2005, 3 pages.
Father, "Hooking Windows API—Technics of Hooking API Functions on Windows", The Assembly-Programming-Journal, vol. 2, No. 2,2004, pp. 1-30.
Finnegan, "Hook and Monitor Any 16-bit Windows Function with Our ProcHook DLL", Microsoft Systems Journal,Jan. 1994, pp. 45-74.
Ishai, "Why Does the Compiler Generate a MOV EDI, EDI Instruction at the Beginning of Functions?", Retrieved from: <http://blogs.msdn.com/b/ishai/archive/2004/06/24/165143.aspx> on Nov. 4, 2011,Jun. 24, 2004, 1 page.
Ivanov, "API Hooking Revealed", Retrieved from: <http://www.codeproject.com/system/hooksys.asp> on Nov. 22, 2007, 2002, 12 pages.
Pietrek, "Learn System-Level Win32 Coding Techniques by Writing an API Spy Program", Microsoft Systems Journal,Dec. 1994, pp. 17-44.
Sotirov, "Hotpatching and the Rise of Third-Party Patches", BlackHat USA 2006, 2006, 32 pages.

* cited by examiner

RUNTIME CODE HOOKING FOR PRINT DRIVER AND FUNCTIONALITY TESTING

BACKGROUND

This application is a continuation of and claims priority under 35 U.S.C. §120 to U.S. patent application Ser. No. 12/055,300, filed on Mar. 25, 2008 and titled "Runtime Code Hooking for Print Driver and Functionality Testing", the disclosure of which is incorporated by reference herein in its entirety.

BACKGROUND

Developers and administrators may wish to hook executable code to an existing module, function, or other target code for a variety of purposes. Code hooking involves injecting instructions into the target code to cause execution of alternate code, e.g., the hooked code. For instance, code hooking may be used to test the target code, to provide added functionality (e.g., extensions), to update or patch the target code, and so on.

One traditional technique to change an existing function or other target code involves redeveloping the target code to include the new instructions. The software project may then be entirely recompiled and redistributed. This technique relies upon direct changes to the source code and recompilation(s) of the entire software project. Accordingly, the technique is not suited to modifications made at runtime and may involve time consuming and costly redevelopment. Further, such a change may not be an option when the source code is not available.

Another technique to change an existing function or other target code involves overwriting an import address table (TAT) that may dynamically link to external functions. This technique allows code to be hooked by modifications to the TAT that is loaded by an application at runtime. The TAT holds references to imported functions, such as those loaded from a dynamic link library (DLL). By overwriting the address of a function in the TAT with an alternate function, code flow may be redirected to the alternate function. While TAT overwriting is suited for some scenarios, TAT overwriting is typically limited to inter-module calls because the linkers that use the TAT are limited to making local calls within the same module. Further, the TAT overwriting techniques may be defeated by direct calls to a function (e.g., static linking) Thus, TAT overwriting may not be suitable for certain applications, such as counters, tracking, error trapping, and so forth, because some calls to the target function (e.g., direct calls) may be missed.

SUMMARY

Runtime code hooking techniques are described in which a place holder instruction within a compiled module is used as an entry point to enable code hooking. A hook function to modify a target function is developed. At runtime, the target function to be modified is located. A place holder instruction within the target function is overwritten with instructions to cause execution of the hook function when the target function is called.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Developers and administrators hook executable code to an existing module, function, or target code for a variety of purposes. For instance, code hooking may be used for testing the target code, to provide added functionality (extensions), to update or patch the target code, and so on. However, traditional techniques to hook executable code involved direct changes to source code and recompiling of the code, which may be time consuming and costly.

Runtime code hooking techniques are described in which a place holder instruction within a compiled module is used as an entry point to enable code hooking. In implementation, a developer may create a hook function to modify a target function that relates to printing functionality of a computing device. For example, the hook function may be created to track printer handle leaks related to a target function that assigns printer handles. The hook function may be stored in memory of the computing device or a location accessible to the computing device. At runtime, the target function to be modified with the hook function is located. For example, a location of the target function in memory or remote storage may be determined through interaction of a verification tool with the operating system of the computing device. Then, the verification tool may operate to overwrite a place holder instruction within the target function with instructions that cause the hook function to be executed when the target function is called. In an implementation, the verification tool is configured to interact with one or more application programming interfaces (APIs) of the operating system to locate a target function and overwrite place holder instruction within the target function. The place holder instruction enables code hooking at runtime that may occur without recompiling the code or even rebooting the system. In this manner, a developer may modify an existing code project to test the code, add new functionality, debug the code, and so forth.

In the following discussion, an exemplary environment is first described that is operable to perform runtime code hooking techniques. Exemplary procedures are then described that may be employed in the exemplary environment, as well as in other environments. Although these techniques are described as employed within an exemplary computing environment in the following discussion, it should be readily apparent that these techniques may be incorporated within a variety of environments without departing from the spirit and scope thereof.

Exemplary Environment

Figure 1:
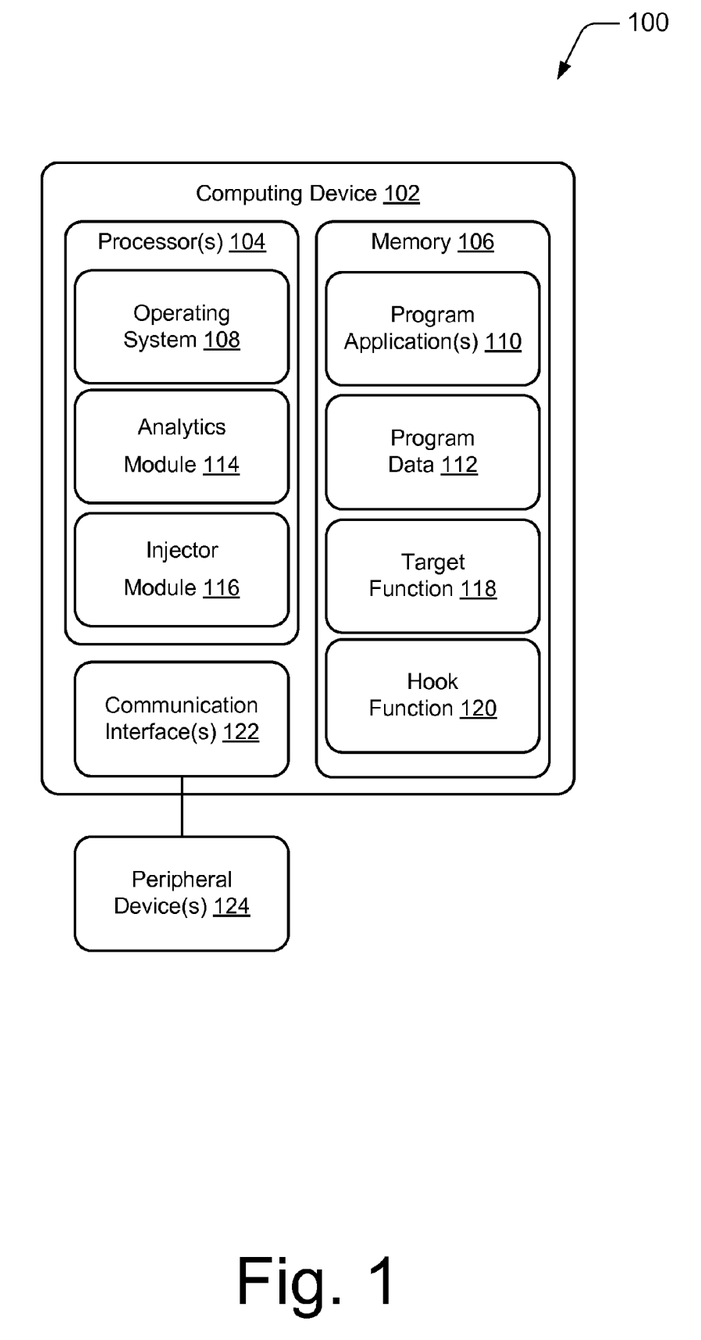
FIG. 1 depicts an exemplary environment in which runtime code hooking techniques may be employed.

FIG. 1 is an illustration of an environment 100 in an exemplary implementation that is operable to employ runtime code hooking techniques described herein. The illustrated environment 100 includes a computing device 102 having one or more processors 104 and a memory 106. Computing device 102 may be configured in a variety of ways. For example, computing device 102 may be configured as a computer that is capable of communicating over a network, such as a desktop computer, a mobile station, an entertainment appliance, a set-top box communicatively coupled to a display device, a wireless phone, and so forth.

In the following description a referenced component, such as computing device 102, may refer to one or more entities, and therefore by convention reference may be made to a single entity (e.g., the computing device 102) or multiple entities (e.g., the computing devices 102, the plurality of computing devices 102, and so on) using the same reference number.

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Additionally, although a single memory 106 is shown for the computing device 102, a wide variety of types and combinations of memory may be employed, such as random access memory (RAM), hard disk memory, video memory, removable medium memory, and other types of computer-readable media.

The one or more processors 104 are illustrated as executing an operating system 108 which is also storable in the memory 106. Memory 106 also includes a variety of program applications 110 and related program data 112. The one or more processors 104 may retrieve and execute computer-program instructions from program applications 110 to provide a wide range of functionality to the computing device 102, including but not limited to office productivity, email, media management, printing, networking, web-browsing, and so forth. A variety of program data 112 is contemplated, examples of which include office documents, multimedia files, emails, data files, web pages, user profile and/or preference data, and so forth.

Processor 104, in addition to executing the operating system 108, is further illustrated as executing an analytics module 114 and an injector module 116, each of which may also be stored in the memory 106. While depicted as stand-alone applications in FIG. 1, the analytics module 114 and injector module 116 may also be implemented as components of a common program application 110.

Analytics module 114 and injector module 116 are representative of functionality of the computing device 102 operable to perform runtime code hooking techniques described herein. By way of example, a target function 118 and a hook function 120 are illustrated as stored in memory 106 of computing device 102. The hook function 120 may be developed, retrieved, and/or stored through operation of the analytics module 114. Then, through various interactions of the analytics module 114 and injector module 116 with the operating system 108, the hook function 120 may be "hooked" to the target function 118. More particularly, analytics module 114 and injector module 116 may be operable at runtime to "hook" the hook function 120 to the target function 118.

"Hooking" in reference to the described techniques refers to injection of instruction(s) in a target function 118 to cause execution of the hook function 120 when calls are made to the target function 118. In an implementation, analytics module 114 and injector module 116 perform the hooking at runtime through one or more place holder instructions included in the target function 118 at compile time. The one or more place holder instructions may be intentionally introduced when a code project is compiled (e.g., at compile time) to enable code hooking in the future, e.g., at runtime. Further discussion of using place holder instructions to perform runtime code hooking techniques may be found in relation to the following figures.

Computing device 102 is also depicted a having communication interfaces 122 which may communicatively couple the computing device 102 to a wide range of peripheral devices 124, examples of which include but are not limited to a display, a printer, a network router, a communication network and so forth. In one or more embodiments, runtime code hooking techniques may be employed in relation to operation of the peripheral devices 124. In particular, code may be hooked to a target function 118 to facilitate development, managing, testing, debugging, and administering of program applications 110 related to operation and performance of various peripheral devices 124.

Generally, the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide runtime code hooking are platform independent, meaning that the techniques may be implemented on a variety of commercial computing platforms having a variety of processors.

Figure 2:
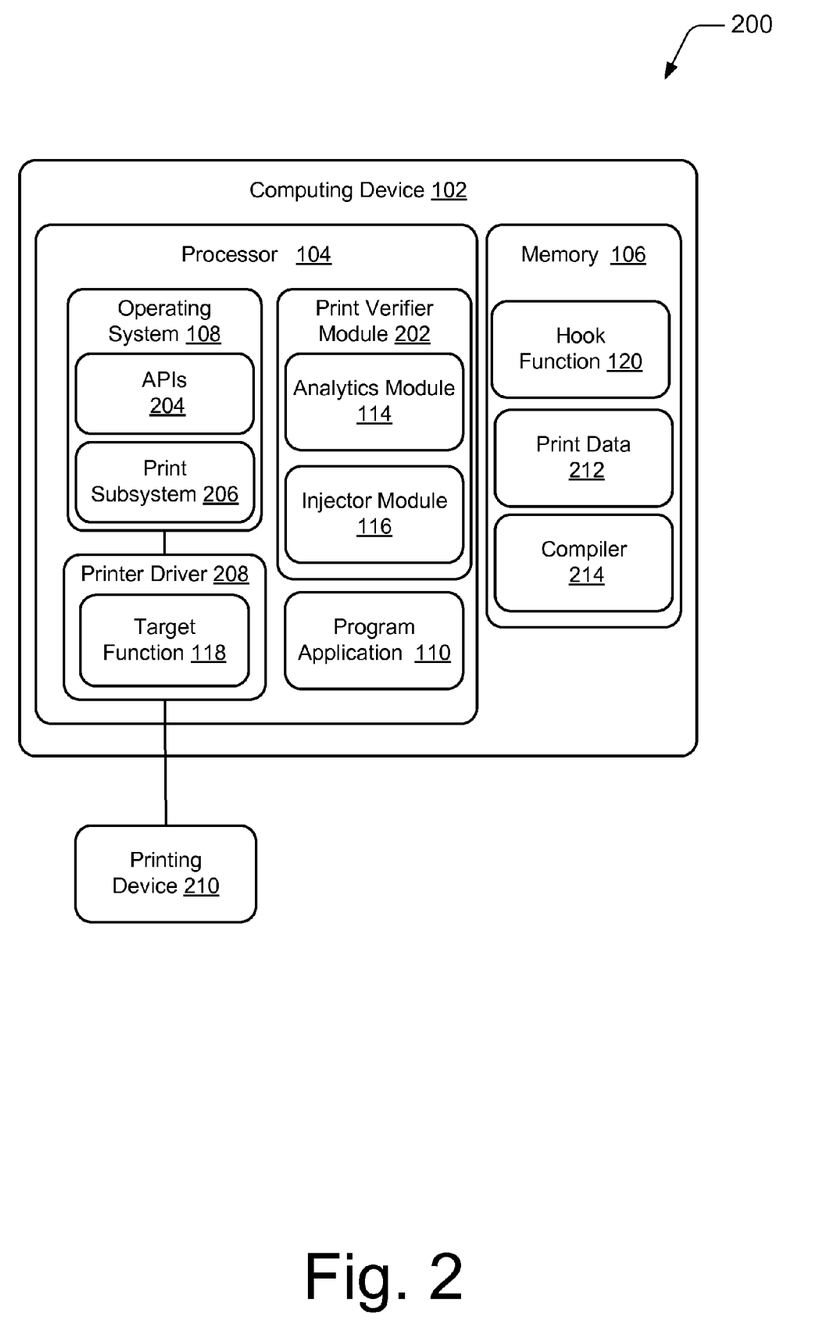
FIG. 2 depicts an example computing device in which runtime code hooking techniques are employed to monitor and/or modify associated printing functionality.

FIG. 2 depicts an exemplary embodiment 200 of a computing device 102 of FIG. 1 illustrating certain aspects in greater detail. In the depicted example, the computing device 102 of FIG. 1 is illustrated as configured to perform runtime code hooking techniques in relation to various printing functionality, which may be provided through the computing device 102 when coupled to one or more printers. While certain aspects are described herein in relation to printers and print functionality, those of skill in the art will appreciate that the described techniques for runtime code hooking are applicable in a variety of contexts and/or with program applications 110 related to various peripheral devices 124, of which print functionality of a printer is but one example.

The computing device 102 in FIG. 2 is illustrated as having a processor 104 and memory 106, as discussed in relation to FIG. 1. Further, the processor 104 is illustrated as executing the operating system 108 and a print verifier module 202. In the example of FIG. 2, the operating system 108 includes application program interfaces (APIs) 204 and a print subsystem 206. APIs 204 provide core tools and functions that may be used to take advantage of the operating system functionality, including printing functionality. Generally APIs are interfaces that various program applications 110 may call to take advantage of various tools and services provided by the operating system 108. While the APIs 204 are illustrated as a single group, it is noted that different APIs 204 or groups of the APIs 204 may be arranged as different operating system components. For example, certain APIs 204 to provide printing specific functionality may logically be considered part of the print subsystem 206. A variety of other examples are also contemplated.

Further, the computing device 102 may include one or more printer drivers 208 to facilitate communication with one or more printing devices 210 that may be communicatively coupled to the computing device 102, locally or over a network. The operating system 108 may support a variety of printer drivers 208 to enable printing to many different printing devices 210. The print subsystem 206 may include various printing specific APIs, core tools, and system drivers. Further, the printing specific APIs, core tools, and system drivers of the print subsystem 206 may interact with a printer driver 208 to enable communication between print functionality of the operating system 108 and a corresponding printing device 210 for which the printer driver 208 is developed. Printer driver 208 may represent a driver developed by a third party (e.g., a printer manufacturer) for a corresponding printing device 210.

An application program 110 may generate print data 212, which in FIG. 2 is illustrated as stored in memory 106. For instance, in a word processing program a user may create a formatted text document and then select a print command to cause output of the document on the printing device 210. When a print command of an application program 110 is selected, the application program 110 may output print data 212 and interact with the various APIs 204 and the print subsystem 206 to access printing functionality available through the operating system 108 and to create a print job. The operating system 108 and print subsystem 206 may process and format the print job for output to the printing device 210. A printer driver 208 facilitates communication between the computing device 102 and a corresponding printing device 210 and may operate to format print data 212 related to the print job in a language and/or format understandable by the printing device 210. Printer driver 208 may be configured to use various core tools provided via the print subsystem 206 and to make calls to APIs 204 of the operating system 108 to output the printing data 212 via the printing device 210.

The print verifier module 202 is representative of functionality to access, manage, test, debug, troubleshoot, and administer printing functionality of the computing device 102. Print verifier 202 may be configured to include a set of integrated tools to perform static and/or runtime verification and testing of the print subsystem 206 for compatibility, stability, and security. Print verifier 202 may be implemented as a helper tool that may be employed by developers and administrators to catch and resolve printing related problems.

For example, print verifier 202 may be configured to test problems with printing related APIs 204, examples of which include but are not limited to: print handle tracking, printer handle leak detection, and multithreaded usage of printer handles. Print verifier 202 may also provide tools to catch problems between core print functionality of the print subsystem 206 and printer drivers 208 developed by third parties such as: non-conforming print tickets; misuse of device driver interfaces; and incompatible communication formats. Further, for testing purposes, the print verifier 202 may intentionally inject faults and monitor the response and error handling procedures of the print subsystem 206 and printer drivers 208.

Runtime code hooking techniques may occur in relation to the functions of the print verifier 202, e.g., to enable the print verifier 202 to access, manage, test, debug, troubleshoot, and administer printing functionality of the computing device 102. For instance, the analytics module 114 and injector module 116 of FIG. 1 are depicted as being integrated with the print verifier module 202. By way of example, a target function 118 is illustrated in FIG. 2 as a component of a printer driver 208. Further, a hook function 120 which has been developed to test, debug, update, or patch aspects of the printer driver 208 and/or print subsystem 206 is illustrated as stored in the memory 106. Through interactions of the analytics module 114 and injector module 116 with the operating system 108, APIs 204, and/or the print subsystem 206, the hook function 120 may be "hooked" to the target function 118 to test, update, or patch the printer driver 208.

While target function 118, to which a hook function 120 is to be hooked, is illustrated in FIG. 2 as a component of a printer driver 208, the target function 118 may also be a component the operating system 108, an API 204 of the operating system 108, or a component of the print subsystem 206. In this case, the target function 218, rather than being part of the printer driver 208, is a component of the operating system 108 which the printer driver 208 may rely upon to output a print job. Target function 118 may also be a component of a separate program application 110.

In an embodiment, the target function 118 may be included as a function in a dynamic link library (DLL) provided by the operating system 108 and/or available in memory 106 of the computing device 102 which may be called by various program applications 110. DLLs may be used to avoid having to statically code common procedures into each program application 110 or module that uses one or more procedures. Thus, common procedures may be offloaded from a program application 110 itself to a DLL and then imported at runtime from the DLL.

In accordance with the described techniques, runtime code hooking may occur via one or more place holder instructions included at compile time in the target function 118. For instance, memory 106 is illustrated as storing a compiler 214, which is representative of functionality to translate source code into executable code. Further, at compile time the compiler 214 may be configured to introduce place holder instructions into a code project to facilitate future code hooking. In an embodiment, the compiler 214 introduces a place holder instruction as a first instruction of a function, such as the illustrated target function 118. The compiler 214 may introduce place holder instructions into each function of a code project. The place holder instruction may be a non-operative instruction whose intended purpose is to be overwritten by other instructions (e.g., a jump instruction) when code hooking is desired. Thus, when code is not hooked to the target function 118, the place holder instruction may be dormant. However, a developer or administrator may use the place holder instruction as an entry point to "hook" code to the target function 118. Further, the place holder instruction is a known quantity that is in a known place within the target function and is accordingly known to be safe to overwrite. Thus, a developer or administrator may use the place holder instruction for runtime code hooking without having to search for suitable instructions that can be safely overwritten. Further, since the overwritten instruction may not have an operational function, the place holder instruction may be overwritten without having to maintain a copy of overwritten instructions to enable a callback to the target function 118 or otherwise perform the function of the overwritten instruction.

In an implementation, a relatively small place holder instruction may be included in the target function so that the expense of executing the function (e.g., processing time) in the absence of code hooking is kept low. In other words, the size of the place holder instruction introduced into a target function 118 may be optimized for the situation in which the place holder instruction is not used for code hooking. In this case, the place holder instruction may be a few bytes in size (e.g., less than 5 bytes), which may not be sufficient to write a jump instruction to the hook function 120.

To provide sufficient space to write a jump instruction to the hook function 120, the compiler 214 may be configured to maintain gaps between functions in a code sequence. Thus, the relatively small place holder instruction is sufficient to write a jump to a gap placed in the code sequence between the target function 118 and other functional blocks. The gaps maintained by the compiler 214 may comprise a plurality of non-operative instructions which are sufficient to write a longer jump (e.g., 5 bytes or more) to the hook function 120. Thus, overwriting may include overwriting the place holder instruction with a jump instruction to a plurality of non-operative instructions in the code sequence and then overwriting of the plurality of non-operative instructions with an instruction to jump to the hook function 120.

It is noted that the compiler 214 may operate on a separate computing device to compile code that is developed in a separate environment (e.g., a development environment) and which is then distributed for end-use by many computing devices 102. For example, a printer driver 208 may be distributed by a printer manufacturer along with a corresponding printing device 210. However, for simplicity sake, the compiler 214 is depicted as a component of the illustrated computing device 102 of FIG. 2. Compiler 214 may represent functionality operable by the computing device 102 or by separate computing devices to introduce place holder instructions for the purpose of code hooking into a target function 118 at compile time. Additional discussion of techniques that use place holder instructions to perform code hooking may be found in relation to the following figures.

Figure 3:
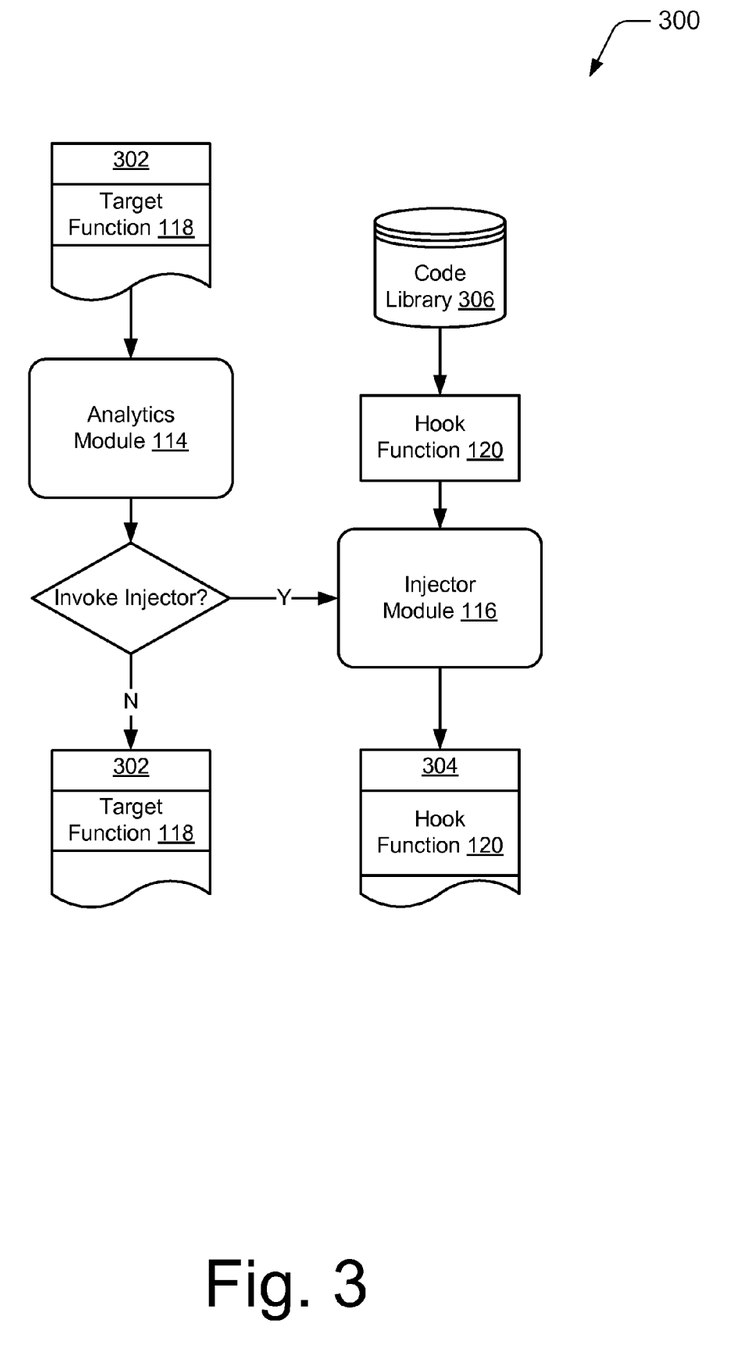
FIG. 3 depicts an exemplary representation of code blocks and code flow related to runtime code hooking techniques.

FIG. 3 depicts an exemplary diagram 300 having representative code blocks and code flow that may occur with and without hooking code to a target function 118. In the example of FIG. 3, a code block 302 includes instructions to cause execution of a target function 118. Another code block 304 includes instructions to cause execution of a hook function 120 in place of the target function 118. A code library 306 is representative of suitable storage where a hook function 120 to be hooked to the target function 118 may be maintained. For instance, code library 306 may be stored in memory 106 locally by computing device 102 depicted in FIG. 1. Code library 306 may also be accessible to a computing device 102 at suitable remote location. Computing device 102 may then access the code library 306 over a network from the remote location to retrieve and/or download associated functions.

In operation, analytics module 114 may be configured to specify whether or not code is to be hooked to a target function 118. For instance, a developer or administrator may operate the analytic module 114 to specify various target functions 118 to be modified and to indicate hook functions 120 which are to be hooked to the target functions 118. The developer or administrator may input information to identify hook functions 120, such as a name, address, storage location, universal record locator (URL), and so forth. At runtime, the analytics module 114 may process various code blocks, such as the example code block 302. Analytics module 114 may determine for code block 302 whether to invoke the injector module 116 or not.

If code hooking is specified for the code block 302, analytics module 114 may determine a location, such as a memory address, of the target function 118 to be hooked. In an implementation, the analytics module 118 may call a function location API 204 of the operating system 108 to obtain the location information. Then the analytics module 114 invokes the injector module 116 to inject one or more instructions into the code block 302 to cause execution of the hook function 120 when calls to the target function 118 are made. For instance, analytics module 114 may provide the location of the target function 118 to be hooked to the injector module 116. Further, analytics module 114 may provide information to identify the hook function 120 to the injector module 116 so that the injector module 116 is able to find and/or reference the appropriate hook function 120.

Injector module 116 operates to find one or more place holder instructions within the target function 118 and to overwrite the instructions to cause execution of the hook function 120. For instance the place holder instruction may be overwritten with a jump instruction specifying a jump to the hook function 120. In the illustrated example, the jump instruction may reference the location of the hook function 120 within the code library 306. In an implementation, the injector module 116 may interact with a code insertion API 204 of the operating system 108 to cause the place holder instruction(s) to be overwritten with the jump instructions. The result is the example code block 304 which is configured to cause execution of the hook function 120 when calls are made to the target function 118.

If code hooking is not specified, then the original code block 302 may be maintained and calls to the target function 118 will remain unaffected, e.g., the original target function 118 is executed. Further discussion of techniques to hook code to a target function 118 may be found in relation to the following procedure.

Exemplary Procedures

The following discussion describes techniques related to runtime code hooking that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the exemplary environment 100 of FIG. 1 and the exemplary computing device 200 of FIG. 2.

Figure 4:
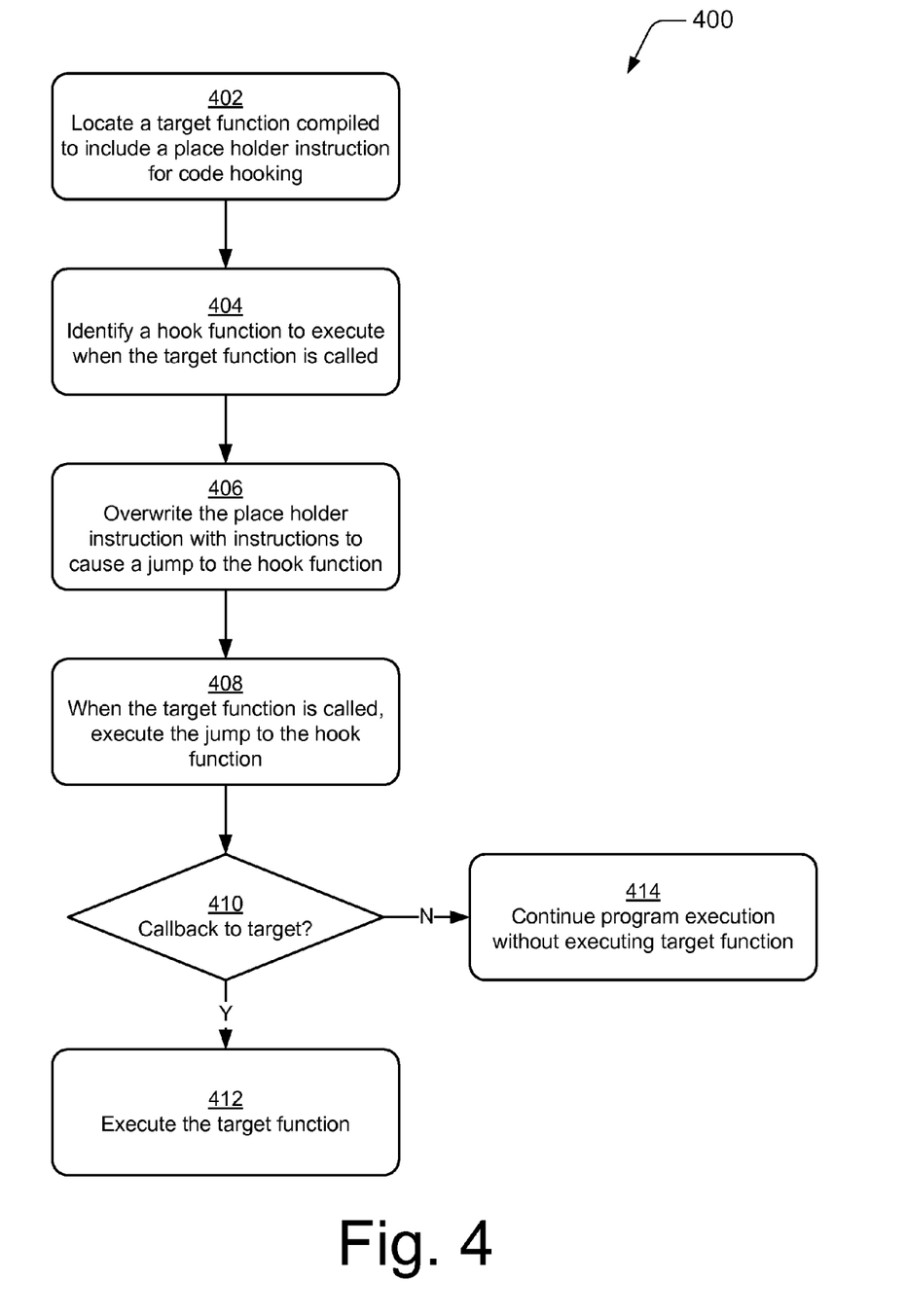
FIG. 4 depicts an exemplary procedure in which a target function is modified at runtime to cause execution of a hook function when the target function is called.

FIG. 4 depicts a procedure 400 in an exemplary implementation in which a target function is modified at runtime to cause execution of a hook function when the target function is called. A target function is located that is compiled to include a place holder instruction for code hooking (block 402). For example, assume that a hook function 120 is developed to test for printer handle leaks. In this example, a target function 118 within a DLL related to assignment and management of printer handles may be specified to be "hooked" to the hook function 120. For example, an open printer API 204 which assigns a printer handle may be included with the operating system 108 and/or print subsystem 206. In accordance with the techniques described herein, the open printer API 204 may be compiled by a compiler 214 to include one or more place holder instructions to enable runtime code hooking. Accordingly, the open printer API may be or may include a suitable target function 118 to which the hook function 120 to test for printer handle leaks may be "hooked".

In implementation, analytics module 114 of FIG. 1 may be configured with information sufficient to identify the target function 118 (e.g., a function name, DLL name, URL, and so forth) and to identify the hook function 120 to be hooked to the target function 118. At runtime, the analytics module 114 may determine a location of the identified target function 118. For instance, the analytics module 114 may call a function location API 204 of the operating system 108 to obtain a memory location or address of the target function 118, in this example the open printer API 204.

A hook function is identified and that is to execute when the target function is called (block 404). Continuing the preceding example, the hook function 120 that is developed to test for printer handle leaks may be stored in memory 106 of the computing device of FIG. 1. Alternatively, the hook function 120 may be available from a suitable remote storage location over a network. In either case, analytics module 114 may be configured with information to identify the hook function 120 and where the hook function 120 is available, such as indicating a DLL in which the hook function is located, a name, a web address, and so forth. To cause hooking of the hook function 120 to the target function 118, analytics module 114 may pass the information identifying the hook function 120 along with the information specifying the location of target function 118 to the injector module 116, which is configured to perform the hooking.

A place holder instruction is overwritten with instructions to cause a jump to the hook function (block 406). In an implementation, injector module 116 may call one or more APIs 204 of the operating system 108 to perform the code hooking. For example, through interaction with the operating system 108 and various APIs 204, the injector module 116 may retrieve the target function 118, ensure a suitable place holder instruction exists, identify the place holder instruction, determine a location of the place holder instruction, and write the jump instruction(s) in the determined location to overwrite the place holder instruction. It is noted that injector module 116 is configured to perform the hooking at runtime, e.g., when the target function 118 is loaded. The code hooking occurs without having to recompile or reload the code and without having to reboot the system. Further, as the jump instruction directly modifies a place holder instruction in the target function 118, both static calls and dynamic calls which use an import address table to the target function 118 will be redirected to the hook function 120.

Then, when the target function is called, the jump to the hook function is executed (block 408). In this case, the hook function 120 is executed and may perform various print handle tracking functions. The hook function 120 may generate results which are provided back to the analytics module 114 for further processing. For instance, hook function 120 may determine which handles are in use, how long the handles have been in use, and indicate whether handle leaking is suspected. A variety of other examples are also contemplated.

It is noted that a hooked function 120 may be executed in addition to or in lieu of the target function 118 to which the hook function 120 is hooked. Thus, the hook function 120 may or may not include a callback to the target function 118. For example, if the hook function 120 provides a fix to a bug in the target function 118, then the target function 118 may be bypassed to avoid the bug. However, if the hook function 120 provides a monitoring function, such printer handle leak detection in the above example, then the instructions in the target function 118 may be executed. In this case, the hook function 120 may callback to target function 118.

In particular, a determination is made whether to callback to the target function (block 410). If a callback is determined, program flow returns to execute the target function (block 412) after the jump instruction. It is noted that since the jump instruction overwrites a place holder instruction, the place holder instruction may be overwritten without preserving the place holder instruction. Thus, the overwritten place holder instruction need not be copied to the hook function or otherwise stored. To perform the function of the original target function 118, the callback may simply return to the next instruction of the target function 118 (e.g. after the place holder).

If a callback is not determined, program execution continues without executing target function (block 414), e.g., the target function is bypassed. In this manner, runtime code hooking may be used to execute a hook function 120 in addition to or in lieu of the target function 118 to which the hook function 120 is hooked.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
  testing a device driver of an operating system, the testing comprising:
    calling an application programming interface exposed by the operating system to determine a location of a target function of the device driver to modify on a computing device, the device driver compiled to inject place holder instructions as non-operative entry points into each function of the device driver including the target function;
    responsive to the calling, obtaining location information for the target function via the application programming interface;
    identifying a hook function within a code library to execute instead of the target function when a call is made to the target function, the hook function configured to test capabilities of the device driver and at least identify incompatible communication formats between the operating system and the device driver; and
    overwriting a place holder instruction injected into the target function with a jump instruction to cause execution of the hook function.

2. The method as recited in claim 1, wherein:
  the device driver is compiled to include gaps between functions in a code sequence for the device driver to enable insertion of instructions sufficient to jump to hook functions; and
  overwriting comprises:
    overwriting the place holder instruction with a jump instruction to jump to one of said gaps; and
    inserting instructions sufficient to jump to the hook function in the one of said gaps.

3. The method as recited in claim 1, wherein the calling comprises calling one or more application programming interfaces (APIs) of the operating system of the computing device to receive a memory location of the target function.

4. The method as recited in claim 3, wherein the overwriting comprises calling the one or more application programming interfaces (APIs) of the operating system of the computing device to:
  retrieve the target function from the memory location;
  identify the place holder instruction in the target function; and
  replace the place holder instruction with the jump instruction.

5. The method as recited in claim 1, wherein the place holder instruction is an initial instruction of the target function.

6. The method as recited in claim 1, wherein the place holder instruction injected into the target function has a size that is not sufficient to write a jump instruction directly to the hook function.

7. The method as recited in claim 1, wherein the hook function is configured to provide an extension to functionality of the device driver.

8. The method as recited in claim 1, wherein the hook function is configured to provide an update for code of the device driver.

9. The method as recited in claim 1, wherein the hook function is further configured to test driver handle tracking, handle leak detection or multithreaded usage of handles.

10. A method implemented by a computing device for testing a device driver of an operating system, the method comprising:
determining, based on a call to an application programming interface exposed by the operating system of the computing device, a location of a target function of the device driver to be modified on the computing device, the device driver including place holder instructions injected as non-operative entry points into each function of the device driver including the target function and gaps maintained between functions in code for the device driver;
overwriting a place holder instruction of the target function with a jump instruction to jump to one of said gaps to initiate execution of a hook function instead of the target function when the target function is called, the hook function configured to at least identify incompatible communication formats between the operating system and the device driver; and
inserting instructions in the one of said gaps sufficient to cause execution of the hook function responsive to execution of the jump instruction to jump to the one of said gaps.

11. The method as recited in claim 10, wherein the hook function is configured to test printing functionality provided at least in part through a print subsystem of the computing device.

12. The method as recited in claim 10, further comprising calling one or more application programming interfaces (APIs) of the operating system of the computing device to determine the location of a target function in a memory of the computing device and cause the overwriting and the inserting.

13. The method as recited in claim 10, wherein the overwriting and inserting occur at runtime.

14. The method as recited in claim 10, wherein inserting instructions in the one of said gaps comprises overwriting a plurality of non-operative instructions contained in the one of said gaps with the instructions to jump to the hook function.

15. The method as recited in claim 10, wherein the place holder instruction of the target function has a size that is sufficient to write the jump instruction to the one of said gaps, but is not sufficient to write a jump instruction to the hook function.

16. A system comprising:
one or more device drivers;
one or more processing devices; and
memory storing:
target code;
a hook function configured to modify functionality provided by a target function of the target code to enable testing of driver capabilities including at least testing a device driver of the one or more device drivers for incompatible communication formats; and
one or more modules stored in the memory and executable via the one or more processing devices to test the device driver, the testing comprising:
responsive to a call to an application programming interface exposed by an operating system, receiving information to identify the hook function and the target function of the target code to modify with the hook function, the target code including place holder instructions injected as non-operative entry points into functions of the target code including at least the target function and at least one gap maintained between functions in the target code;
overwriting a place holder instruction of the target function with a first jump instruction to jump to the at least one gap when the target function is called; and
inserting another jump instruction in the at least one gap sufficient to cause a jump to execute the hook function responsive to execution of the first jump instruction.

17. The system as recited in claim 16, wherein:
the place holder instruction of the target function has a size that is insufficient to write a jump instruction to the hook function; and
the at least one gap has a size that is sufficient to write a jump instruction to the hook function.

18. The system as recited in claim 16, wherein the at least one gap includes a plurality of non-operative instructions that are overwritten to insert the another jump instruction.

19. The system as recited in claim 16, wherein the hook function is configured to bypass the target function.

20. The system as recited in claim 16, wherein the hook function is configured to include a callback to the target function to cause execution of the target function following execution of the hook function.

* * * * *